(12) United States Patent
Taherzadeh Boroujeni et al.

(10) Patent No.: US 10,624,039 B2
(45) Date of Patent: Apr. 14, 2020

(54) SYSTEM AND METHOD FOR POWER OFFSET ADJUSTMENTS FOR DOWNLINK COMMUNICATIONS

(71) Applicant: Huawei Technologies Co., Ltd., Shenzhen (CN)

(72) Inventors: Mahmoud Taherzadeh Boroujeni, Ottawa (CA); Alireza Bayesteh, Ottawa (CA); Hosein Nikopour, San Jose, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 117 days.

(21) Appl. No.: 15/205,599

(22) Filed: Jul. 8, 2016

(65) Prior Publication Data
US 2017/0064645 A1    Mar. 2, 2017

Related U.S. Application Data

(60) Provisional application No. 62/211,484, filed on Aug. 28, 2015.

(51) Int. Cl.
*H04W 52/18* (2009.01)
*H04B 7/0456* (2017.01)
(Continued)

(52) U.S. Cl.
CPC .......... *H04W 52/18* (2013.01); *H04B 7/0465* (2013.01); *H04L 1/0003* (2013.01);
(Continued)

(58) Field of Classification Search
CPC .......... H04W 52/0206; H04W 52/143; H04W 52/16; H04W 52/18; H04W 52/20;
(Continued)

(56) References Cited

U.S. PATENT DOCUMENTS 7,613,474 B2    11/2009   Lee
2007/0253507 A1*  11/2007   Zhou .................... H04L 1/0001
                                             375/267
(Continued)

FOREIGN PATENT DOCUMENTS

CN    104619002 A     5/2015
WO    2005125048 A1   12/2005
(Continued)

OTHER PUBLICATIONS

3rd Generation Partnership Project; Technical Specification Group Radio Access Network; Evolved Universal Terrestrial Radio Access (E-UTRA); Physical channels and modulation (Release 12); 3GPP TS 36.211 V12.3.0, Sep. 2014, 124 pages.
(Continued)

*Primary Examiner* — Joshua Kading
(74) *Attorney, Agent, or Firm* — Slater Matsil, LLP

(57) ABSTRACT

A method for operating a transmission point includes determining power offset levels of data layers assigned to at least one reception point, encoding a first data stream associated with a first data layer to produce a first encoded data, encoding a second data stream associated with a second data layer to produce a second encoded data, and transmitting the first and second encoded data at different power offset levels.

25 Claims, 6 Drawing Sheets

(51) Int. Cl.
*H04W 52/02* (2009.01)
*H04W 52/14* (2009.01)
*H04W 52/16* (2009.01)
*H04W 52/28* (2009.01)
*H04L 1/00* (2006.01)
*H04B 1/69* (2011.01)

(52) U.S. Cl.
CPC ....... *H04L 1/0009* (2013.01); *H04W 52/0206* (2013.01); *H04W 52/143* (2013.01); *H04W 52/16* (2013.01); *H04W 52/286* (2013.01); *H04B 1/69* (2013.01); *Y02D 70/126* (2018.01); *Y02D 70/1262* (2018.01); *Y02D 70/14* (2018.01); *Y02D 70/142* (2018.01); *Y02D 70/144* (2018.01); *Y02D 70/166* (2018.01); *Y02D 70/26* (2018.01)

(58) Field of Classification Search
CPC ... H04W 52/24; H04W 52/26; H04W 52/286; H04W 52/386; H04W 52/42; H04B 7/0465; H04B 1/69; H04J 13/00
See application file for complete search history.

(56) References Cited

U.S. PATENT DOCUMENTS

| | | | |
|---|---|---|---|
| 2008/0008257 A1* | 1/2008 | Yonesi | H03M 13/1102 375/262 |
| 2009/0279486 A1* | 11/2009 | Kishigami | H04B 7/0695 370/329 |
| 2010/0260059 A1 | 10/2010 | Zhang et al. | |
| 2013/0114425 A1* | 5/2013 | Sayana | H04B 7/024 370/252 |
| 2014/0169408 A1* | 6/2014 | Bayesteh | H04B 7/0473 375/144 |
| 2016/0043792 A1* | 2/2016 | Jeong | H01Q 3/34 370/328 |
| 2017/0048045 A1* | 2/2017 | Liu | H04B 7/0413 |
| 2018/0123855 A1* | 5/2018 | Yoshizawa | H04L 27/2627 |

FOREIGN PATENT DOCUMENTS

| | | |
|---|---|---|
| WO | 2012026867 A1 | 3/2012 |
| WO | 2015096037 A1 | 7/2015 |

OTHER PUBLICATIONS

"3rd Generation Partnership Propject; Technical Specification Group Radio Access Network; Evolved Universal Terrestrial Radio Access (E-UTRA); Physical layer procedures (Release 12)", 3GPP TS 36.213 V12.3.0, Sep. 2014, 212 pages.

Hoshyar et al., "LDS-OFDM an Efficient Multiple Access Technique", May 16-19, 2010, Vehicular Technology Conference, 5 pages.

* cited by examiner

SYSTEM AND METHOD FOR POWER OFFSET ADJUSTMENTS FOR DOWNLINK COMMUNICATIONS

This application claims the benefit of U.S. Provisional Application No. 62/211,484, filed on Aug. 28, 2015, entitled "System and Method for Power Offset Adjustments for Downlink Communications," which application is hereby incorporated herein by reference.

TECHNICAL FIELD

The present invention relates to digital communications, and, in particular embodiments, to a system and method for power offset adjustments for downlink communications.

BACKGROUND

Sparse Code Multiple Access (SCMA) is a non-orthogonal multiple access scheme that allows multiple devices, or user equipments (UEs), to share channel resources. Potential transmit devices are allocated time and frequency resources, also referred to as resource units. In SCMA, potential transmit devices are also assigned a sparse codebook that allows superposition of device transmissions, which allows SCMA systems to support a greater number of connected devices.

Although communications systems using SCMA offer high bandwidth for larger numbers of connected devices, the ever increasing need for greater bandwidth to support demanding applications (such as high-definition media streaming, faster web browsing, rapid file transfers, and the like) has prompted further study to improve upon the performance afforded by SCMA. Therefore, there is a need to support more connected devices and/or increase the bandwidth available for each connected device.

SUMMARY

Example embodiments provide a system and method for power offset adjustments for downlink communications.

In accordance with an example embodiment, a method is provided for operating a transmission point. The method includes determining, by the transmission point, power offset levels of data layers assigned to at least one reception point, encoding, by the transmission point, a first data stream associated with a first data layer to produce a first encoded data, encoding, by the transmission point, a second data stream associated with a second data layer to produce a second encoded data, and transmitting, by the transmission point, the first and second encoded data at different power offset levels.

In accordance with an example embodiment, a method is provided for operating a reception point. The method includes determining, by the reception point, power offset levels of data layers, receiving, by the reception point, encoded data from a transmission point, and decoding, by the reception point, at least a portion of the encoded data in accordance with the power offset levels, a forward error correcting (FEC) code, and a size of a constellation associated with the encoded data.

In accordance with an example embodiment, a transmission point is provided. The transmission point includes a processor, and a computer readable storage medium storing programming for execution by the processor. The programming including instructions to configure the transmission point to determine power offset levels of data layers assigned to at least one reception point, encode a first data stream associated with a first data layer to produce a first encoded data, encode a second data stream associated with a second data layer to produce a second encoded data, and transmit the first and second encoded data at different power offset levels.

In accordance with an example embodiment, a reception point is provided. The reception point includes a processor, and a computer readable storage medium storing programming for execution by the processor. The programming includes instructions to determine power offset levels of data layers, receive encoded data from a transmission point, and decode at least a portion of the encoded data in accordance with the power offset levels, a forward error correcting (FEC) code, and a size of a constellation associated with the encoded data.

Practice of the foregoing embodiments enables improved downlink performance in high data rate cases when there is overlap in the SCMA layers.

BRIEF DESCRIPTION OF THE DRAWINGS

For a more complete understanding of the disclosure, and the advantages thereof, reference is now made to the following description taken in conjunction with the accompanying drawings, in which.

DETAILED DESCRIPTION OF ILLUSTRATIVE EMBODIMENTS

Figure 1:
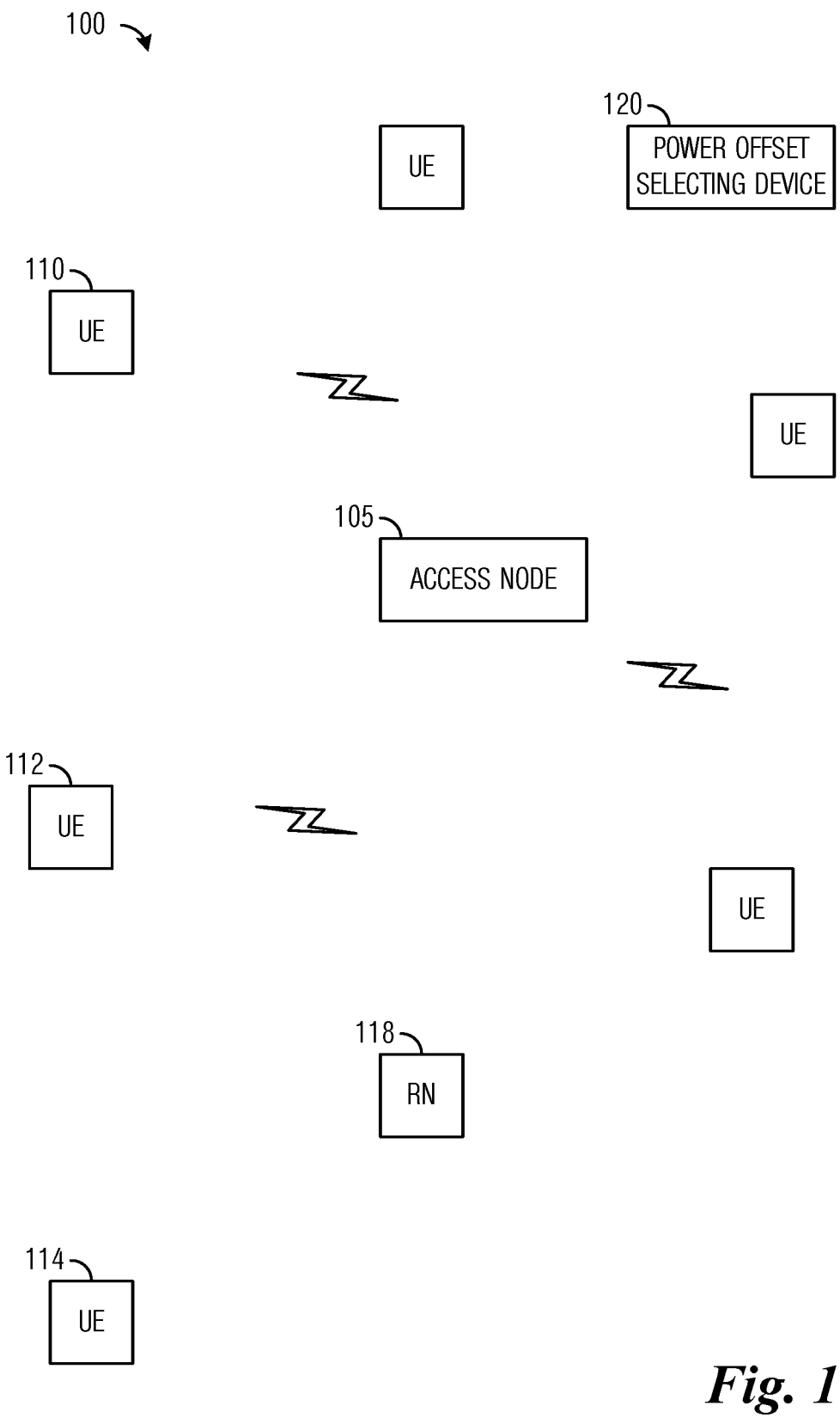
FIG. 1 illustrates an example communications system.

The making and using of example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

One embodiment relates to systems and methods for interference management. For example, a transmission point identifies power offset levels of data layers assigned to at least one reception point, encodes a data stream to produce encoded data, and transmits the encoded data in accordance with the power offset levels.

The embodiments will be described with respect to example embodiments in a specific context, namely communications systems that use Sparse Code Multiple Access (SCMA). The embodiments may be applied to standards compliant communications systems, such as those that are compliant with technical standards, such as Third Generation Partnership Project (3GPP) Long Term Evolution (LTE), IEEE 802.11, and the like, as well as non-standards compliant communications systems, that use SCMA.

In SCMA, data is spread over multiple time-frequency resource units, for example tones of orthogonal frequency division multiple access (OFDMA) resources, through multi-dimensional codewords. In different variations of SCMA, the data may be spread over resource units of code division multiple access (CDMA), single carrier waveforms, filter bank multicarrier (FBMC), filtered OFDM, discrete Fourier transform spread OFDM (DFT spread OFDM), and the like. Sparsity of codewords helps to reduce the complexity of joint detection of multiplexed SCMA layers by using message passing algorithm (MPA) decoders. In general, each layer of SCMA signals has its specific codebook. The increased shaping gain and coding gain realized with the use of multi-dimensional constellations are advantages of SCMA. The shaping and coding gains are usually greater for higher order modulations. Low density spreading (LDS) is used for multiplexing different layers of data with signatures that are sparse, meaning that they have only a small number of nonzero positions. LDS uses repetitions of the same quadrature amplitude modulation (QAM) symbol on layer-specific nonzero positions in time or frequency. As an example, in LDS-orthogonal frequency division multiplexing (LDS-OFDM) a constellation point is repeated over nonzero frequency tones of an LDS block. Some implementations of LDS also include phase rotations.

SCMA is an encoding technique that encodes data streams, such as binary data streams, or in general, M-ary data streams, where M is an integer number greater than or equal to 2, into multidimensional codewords. The dimensions refer to time and/or frequency dimensions and resource units therein, which are used to convey independent symbols. SCMA directly encodes the data stream into multidimensional codewords and circumvents QAM symbol mapping, which may lead to coding gain. Notably, SCMA encoding techniques convey data streams using a multidimensional codeword rather than a QAM symbol. SCMA uses a SCMA codebook to encode the data stream into multidimensional codewords. The SCMA codebook is an example of a spread constellation. The spread constellation, which may also be referred to as a spread modulation map, is achieved by applying a spreading sequence to a constellation. The constellation may also be referred to as a modulation map. The spreading sequence may also be referred to as a signature.

Additionally, SCMA encoding provides multiple access through the use of different codebooks for different multiplexed layers, as opposed to the use of different spreading sequences for different multiplexed layers. Furthermore, SCMA encoding typically uses codebooks with sparse codewords that enable receivers to use low complexity algorithms, such as message passing algorithms (MPA), to detect individual codewords from combined codewords received by the receiver, thereby reducing processing complexity in the receivers.

CDMA is a multiple access technique in which data symbols are spread out over orthogonal and/or near-orthogonal code sequences. Conventional CDMA encoding is a two-step process in which a binary code is mapped to a QAM symbol before a spreading sequence is applied. Although conventional CDMA encoding can provide relatively high data rates, new techniques/mechanisms for achieving even higher data rates are needed to meet the ever-growing demands of next-generation wireless networks.

LDS is used for multiplexing different layers of data. LDS uses repetitions of the same symbol on layer-specific nonzero positions in time or frequency. As an example, in LDS-OFDM a constellation point is repeated over nonzero frequency tones of an LDS block. SCMA uses a codebook-based non-orthogonal multiplexing technique realized by super-imposing multi-dimensional codewords selected from SCMA codebooks. Instead of spreading QAM symbols, coded bits are directly mapped to multi-dimensional sparse complex codewords. One benefit of SCMA codebooks is the shaping gain and coding gain of multi-dimensional constellations. SCMA is classified as a waveform/modulation and multiple access scheme. SCMA codewords are laid over multiple channel resource units, for example multi-carrier tones of OFDM. In SCMA, the combining of data for a plurality of UEs onto a plurality of resource units when the number of UEs is greater than the number of resource units is known as data overloading. Data overloading is achievable with moderate increase in detection complexity due to the sparsity of SCMA codewords. As a result of data overloading, some resource units contain data for more than one UE.

SCMA can show noticeable performance improvements over other multiple access techniques, especially for larger constellation sizes where the gain of multi-dimensional modulation is potentially larger. The spreading and data overloading capabilities of LDS enables some system level benefits, including interference whitening, open-loop user multiplexing and massive connectivity. SCMA is a spreading and multiplexing technique that offers the system benefits of LDS, as well as maintaining or even improving the link performance.

FIG. 1 illustrates an example communications system 100. Communications system 100 supports SCMA communications. Communications system 100 includes an access node 105. Communications system 100 also includes user equipment (UE), such as UE 110, UE 112, and UE 114. Access node 105 includes multiple transmit antennas and multiple receive antennas to support multiple input multiple output (MIMO) operation, wherein a single access node (or transmit node) simultaneously transmits multiple data streams to multiple UEs, or to UEs with multiple data streams per UE, or a combination thereof. Similarly, the UEs may include multiple transmit antennas and multiple receive antennas to support MIMO operation. In general, an access node may also be referred to as an evolved NodeB (eNB), NodeB, a base station, a controller, an access point, and the like. Similarly, a UE may also be referred to as a mobile station, a mobile, a terminal, a subscriber, and the like. Communications system 100 may also include a relay node (RN) 118 that is capable of utilizing a portion of the network resources controlled by access node 105 and allocated to RN 118 to enable RN 118 to help improve coverage and/or overall performance of communications system 100. As an example, access node 105 allocates a subset of the network resources to RN 118, and RN 118 acts as an intermediary by receiving and forwarding messages using the allocated network resources to extend the coverage area of access node 105 or to provide coverage in a coverage hole present in the coverage area of access node 105.

A power offset selecting device 120 may select power offsets for different layers. The power offsets can be selected to achieve one or more performance objectives, and in accordance with one or more communications parameters. Example communications parameters include the transmission rate, the constellation size, the forward error correcting (FEC) code rate, a measure of mutual dependence between an input selected based on the main constellation and an output based on statistical noise (which is referred to herein as the mutual information of the main constellation), required signal to interference plus noise ratio (SINR) levels of a successive interference cancellation (SIC) decoder for decoding multiple layers of data, and actual and/or simulated performance results. Example performance objectives include maximizing the mutual information of the main constellation, and balancing an SINR of the data layers in accordance with the required SINR levels for the SIC decoder. Although power offset selecting device 120 is shown in FIG. 1 as being a single stand-alone device, in other example embodiments there may be multiple power offset selecting devices, each responsible for a different part of a communications system. Alternatively, power offset selecting device 120 may be co-located with another device in communications system 100. As an example, some or all of the access nodes in communications system 100 may include power offset selecting devices.

Although it is understood that communications systems may employ multiple access nodes capable of communicating with a number of UEs, only one access node, one RN, one power offset selecting device, and six UEs are illustrated for simplicity.

SCMA-OFDM is a code-domain multiplexing scheme over multicarrier modulation in which the spreading codebooks are sparse and because detection complexity is a function of the sparsity of the spreading codebooks, detection can be simpler. The wide range of configurable communications system parameters, such as spreading factor, sparsity of codebooks, and number of the maximum SCMA multiplexed layers, indicate the flexibility of SCMA.

Figure 2:
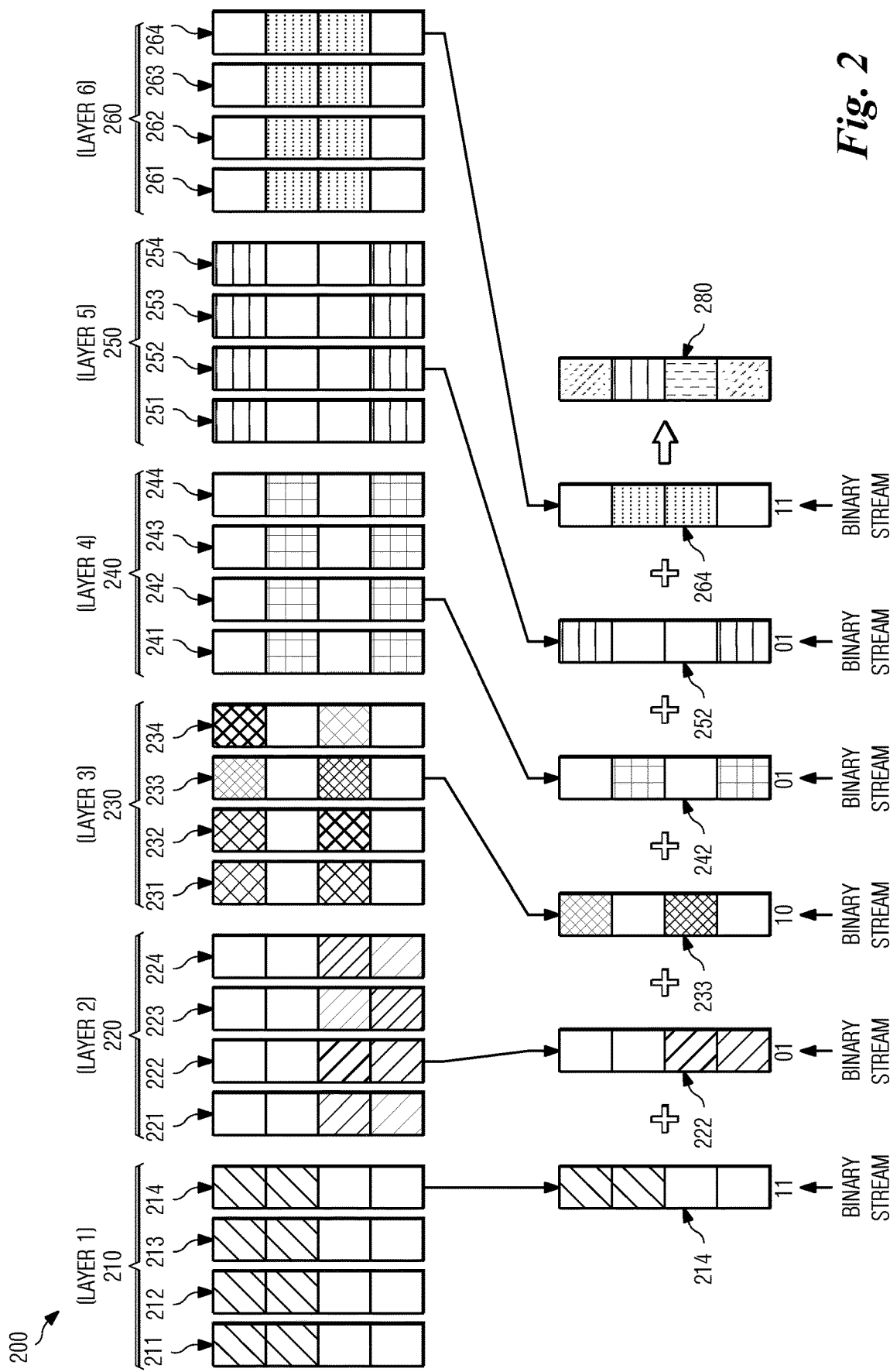
FIG. 2 illustrates an SCMA multiplexing scheme for encoding data according to example embodiments presented herein.

FIG. 2 illustrates an example SCMA multiplexing scheme 200 for encoding data. As shown in FIG. 2, SCMA multiplexing scheme 200 may utilize a plurality of codebooks 210, 220, 230, 240, 250, and 260. Each codebook of the plurality of codebooks is assigned to a different multiplexed layer. Each codebook includes a plurality of multidimensional codewords. More specifically, codebook 210 includes codewords 211-214, codebook 220 includes codewords 221-224, codebook 230 includes codewords 231-234, codebook 240 includes codewords 241-244, codebook 250 includes codewords 251-254, and codebook 260 includes codewords 261-264.

Each codeword of a respective codebook may be associated with a different data value, for example one or more binary bits. In other words, one or more binary bits may be mapped to a codeword of a particular codebook. As an illustrative example, the codewords 211, 221, 231, 241, 251, and 261 are associated with binary value '00', the codewords 212, 222, 232, 242, 252, and 262 are associated with the binary value '01', the codewords 213, 223, 233, 243, 253, and 263 are associated with the binary value '10', and the codewords 214, 224, 234, 244, 254, and 264 are associated with the binary value '11'. It is noted that although the codebooks in FIG. 2 are depicted as having four codewords each, SCMA codebooks in general may have any number of codewords. As an example, SCMA codebooks may have 8 codewords (e.g., associated with binary values '000' . . . '111'), 16 codewords (e.g., associated with binary values '0000' . . . '1111'), or more.

As shown in FIG. 2, different codewords are selected from various codebooks 210, 220, 230, 240, 250, and 260 depending on the binary data being transmitted over the multiplexed layer. In this example, codeword 214 is selected from codebook 210 because the binary value '11' is being transmitted over the first multiplexed layer, codeword 222 is selected from codebook 220 because the binary value '01' is being transmitted over the second multiplexed layer, codeword 233 is selected from codebook 230 because the binary value '10' is being transmitted over the third multiplexed layer, codeword 242 is selected from codebook 240 because the binary value '01' is being transmitted over the fourth multiplexed layer, codeword 252 is selected from codebook 250 because the binary value '01' is being transmitted over the fifth multiplexed layer, and codeword 264 is selected from codebook 260 because the binary value '11' is being transmitted over the sixth multiplexed layer. Codewords 214, 222, 233, 242, 252, and 264 may then be multiplexed together to form multiplexed data stream 280, which is transmitted over shared resources of a network. Notably, codewords 214, 222, 233, 242, 252, and 264 are sparse codewords, and therefore can be identified upon reception of multiplexed data stream 280 using a low complexity algorithm, such as a message passing algorithm (MPA), or a turbo decoder.

In summary, SCMA enables embodiments that provide non-orthogonal multiple access with enhanced spectrum efficiency, lower latency, and lower signaling overhead. SCMA also supports data overloading. The sparsity present in SCMA codewords limits detection complexity.

Figure 3A:
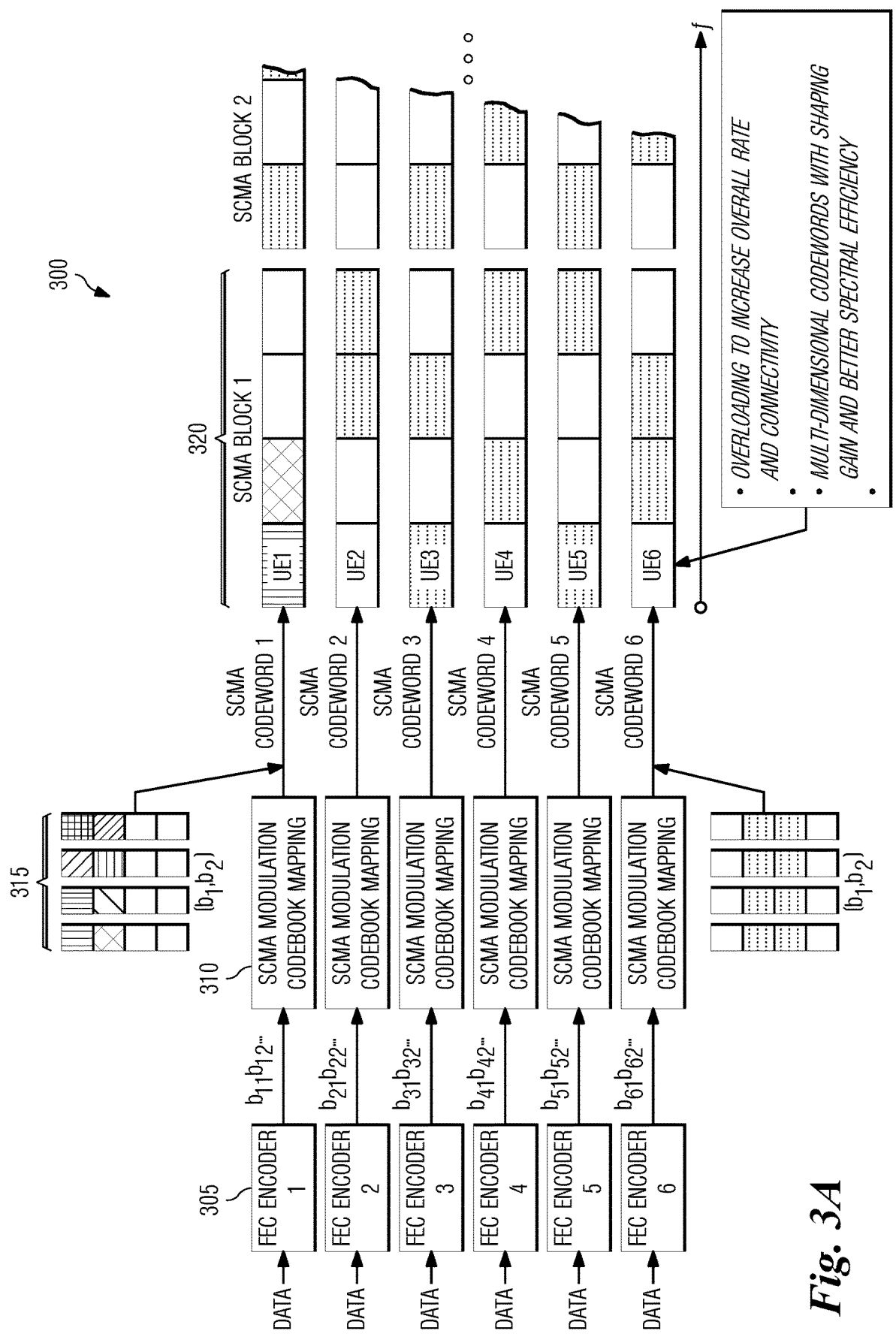
FIG. 3A illustrates a diagram of SCMA blocks and an example process of data being modulated with SCMA codebooks to fill SCMA blocks according to example embodiments presented herein.

FIG. 3A illustrates a diagram 300 of example SCMA blocks and an example process of data being modulated with example SCMA codebooks to fill SCMA blocks. As discussed previously, SCMA codebooks are examples of spread modulation maps. Data to be transmitted is provided to FEC encoders, such as FEC encoder 305, to produce encoded data for different UEs. The data for different UEs is provided to SCMA modulation codebook mapping units, such as SCMA modulation codebook mapping unit 310, to produce SCMA codewords, such as SCMA codewords 315. SCMA codewords are arranged into SCMA block 320.

Figure 3B:
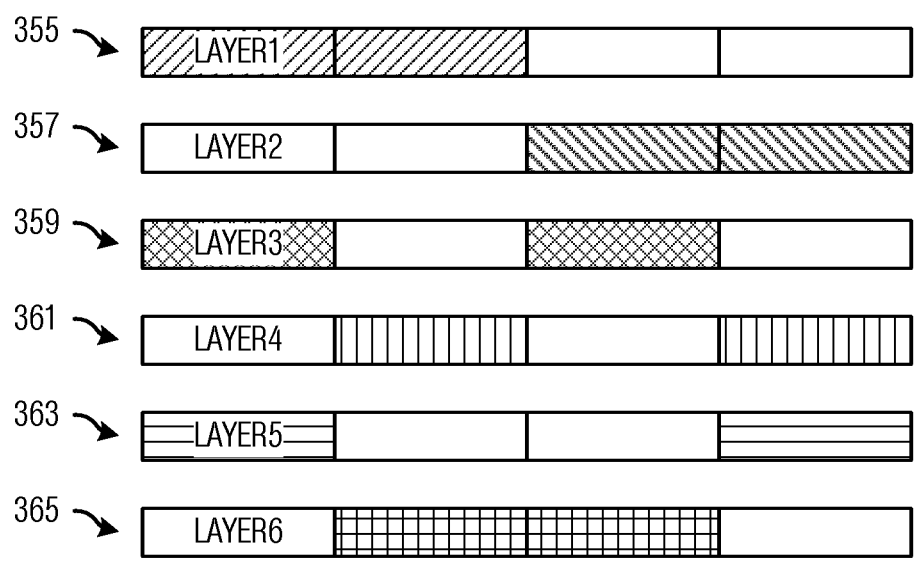
FIG. 3B illustrates an SCMA block highlighting codebook design with power offsets according to example embodiments presented herein.

FIG. 3B illustrates an example SCMA block 350 highlighting codebook design with power offsets. SCMA block 350 includes a plurality of layers, such as layer 1 355, layer 2 357, layer 3 359, layer 4 361, layer 5 363, and layer 6 365. Different SCMA layers may have different power values. The SCMA layers with sparse codes that are orthogonal may have the same power due to their orthogonal nature which keeps the SCMA layers separate.

Power offsets in the data layers help to improve performance, particularly in situations with higher order codebooks (e.g., 8-point and 16-point codebooks). As an illustrative example, different power offsets for different data layers can simplify decoding by enabling decoding of the stronger layers first, followed by the decoding of the weaker layers, for example using successive interference cancellation (SIC). As another example, the different layers with power offsets can be combined into a super constellation with better minimum distance properties, or other improved properties, compared to a constellation combined from different layers without power offsets, which also helps to simplify decoding. As an illustrative example, for a 4 layer codebook, the power offsets of the four layers may be expressed as $[0,0,\alpha,\alpha]$ and for a 6 layer codebook, the power offsets of the six layers may be expressed as $[-\beta,-\beta,0,0,\alpha,\alpha]$ with values in dB, for instance. The optimum values of $\alpha$ and $\beta$ may depend on the MCS level and the number of layers. The optimum values of $\alpha$ and $\beta$ may be found through simulation, for example. Table 1 displays example spectral efficiency (SE) values, along with MCS combinations and power offset values (in dB) for the SE values.

TABLE 1

Example MCS combinations and power offsets for different SE values.

| SE value (bits per tone) | MCS Combination (layers, constellation points, FEC code rate) | Power Offset (dB) |
|---|---|---|
| 1.5 | 4 layers, 16-point, CR 3/8 | [2, 2, 0, 0] |
| 2 | 4 layers, 16-point, CR 1/2 | [3, 3, 0, 0] |
| 2.5 | 4 layers, 16-point, CR 5/8 | [3.8, 3.8, 0, 0] |
| 3 | 4 layers, 16-point, CR 3/4 | [4.5, 4.5, 0, 0] |
| 3.5 | 6 layers, 16-point, CR 7/12 | [4.1, 4.1, 0, 0, −4.1, −4.1] |
| 4 | 6 layers, 16-point, CR 2/3 | [4.6, 4.6, 0, 0, −4.6, −4.6] |
| 5 | 4 layers, 256-point, CR 5/8 | [8.5, 8.5, 0, 0] |
| 6 | 4 layers, 256-point, CR 3/4 | [9.9, 9.9, 0, 0] |

According to an example embodiment, different power levels are used for different layers. The relative offset of the power levels is selected based on one or more communications parameters and selection objectives. As an illustrative example, the relative offset of the power levels is selected based on forward error correcting (FEC) code rate and selection objectives. As another illustrative example, the relative offset of the power levels is selected based on transmission rate and/or constellation size and FEC code rate and selection objectives. As yet another illustrative example, the relative offset of the power levels is selected based on mutual information of the main constellation and selection objectives. As yet another illustrative example, the relative offset of the power levels is selected based on required SINR levels of a SIC decoder implemented at a receiver and selection objectives. As yet another illustrative example, the relative offset of the power levels is selected based on actual and/or simulated performance results and selection objectives. Although the discussion of the example embodiments focuses on SCMA, the example embodiments are also operable with LDS. Therefore, the focus on SCMA should not be construed as being limiting to either the scope or the spirit of the example embodiments.

The use of different power offset levels enables resiliency over slight changes in the channel. Shaping gain may be achieved with very little extra complexity, thereby enabling performance gain over some other access techniques. SCMA does not require large channel quality differences between UEs, which can simplify the pairing of UEs for scheduling purposes.

Figures 4, 5:
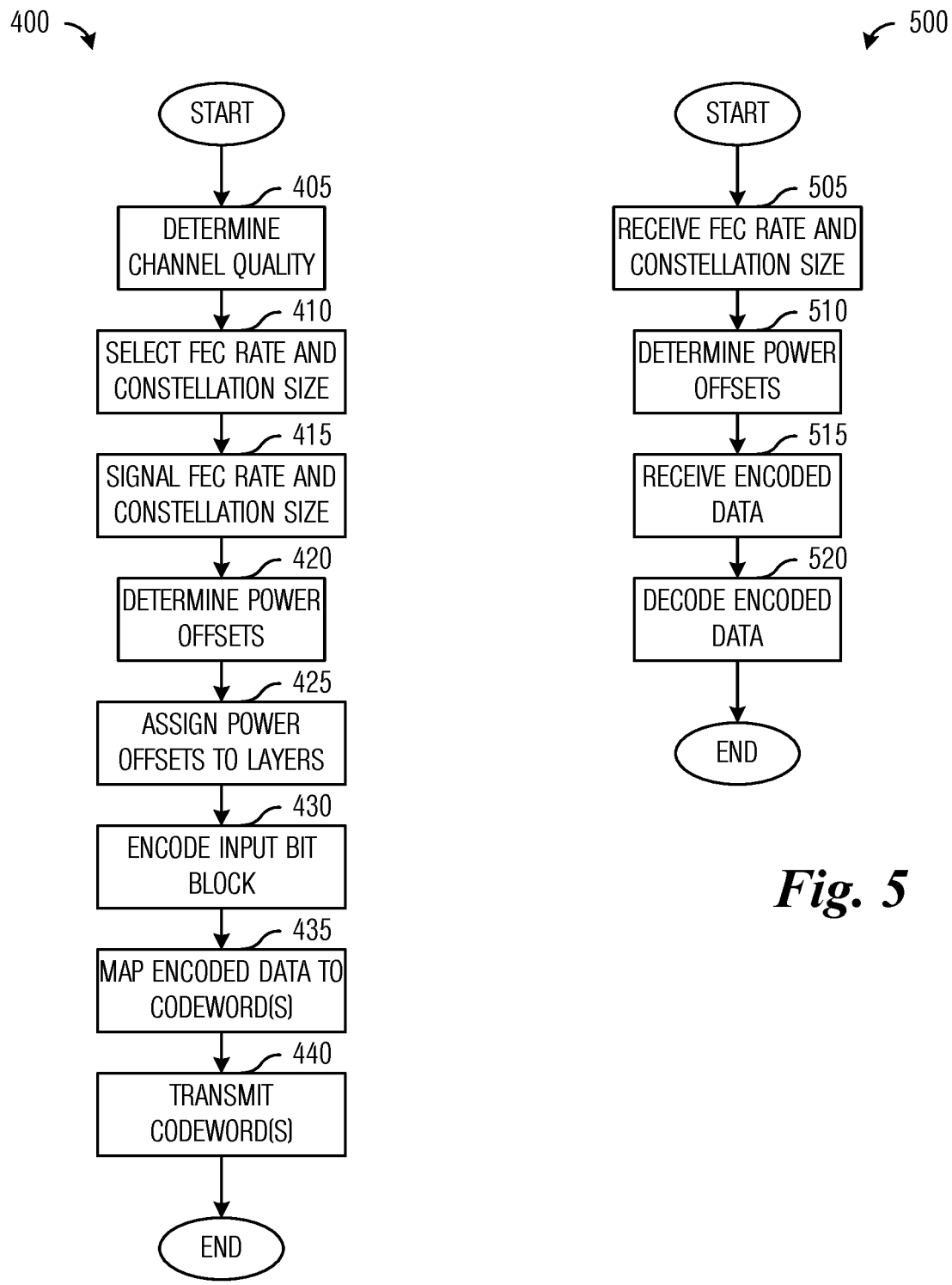
FIG. 4 illustrates a flow diagram of operations occurring in a transmission point according to example embodiments presented herein.
FIG. 5 illustrates a flow diagram of operations occurring in a reception point according to example embodiments presented herein.

FIG. 4 illustrates a flow diagram of example operations 400 occurring in a transmission point. Operations 400 may be indicative of operations occurring in a transmission point.

Operations 400 begin with the transmission point determining the channel quality (block 405). The channel quality may be determined from channel quality reports received by the transmission point, such as those sent by the reception point. Alternatively, when time division duplexing is being used, channel reciprocity is used by the transmission point to determine the channel quality from measurements made by the transmission point. The transmission point selects a FEC code rate and a constellation size for the transmission (block 410). The selection of the FEC code rate and the constellation size may be in accordance with the channel quality. The selection of the FEC code rate and the constellation size may also be made in accordance with the amount of data that the transmission point needs to transmit, the priority of the transmission, Quality of Service (QoS) requirements, service priority, reception point priority, and so on. The transmission point may signal the FEC code rate and the constellation size (block 415). Signaling the FEC code rate and the constellation size simplifies the operations of the reception point because the reception point does not have to determine the FEC code rate and the constellation size from received transmissions. Although time and computationally intensive, the reception point may be able to determine the FEC code rate and the constellation size using blind detection techniques wherein the reception point applies hypotheses of the FEC code rate and the constellation size used in the transmission to find the FEC code rate and the constellation size used in the transmission.

The transmission point determines the power offsets for the various layers (block 420). The power offsets may be determined based on communications parameters and selection objectives. The transmission point assigns the power offsets to the layers (block 425).

Because the power offsets are determined based on the communications parameters and selection objectives, it may be possible for the reception point to determine the power offsets without the transmission point having to explicitly signal the power offsets to the reception point. As an illustrative example, the reception point determines the power offsets from the FEC code rate and selection objectives. As another illustrative example, the reception point determines the power offsets from the transmission rate and/or constellation size and FEC code rate and selection objectives. As yet another illustrative example, the reception point determines the power offsets from the mutual information of the main constellation and selection objectives. As yet another illustrative example, the reception point determines the power offsets from required SINR levels of a SIC decoder and selection objectives. As yet another illustrative example, the reception point determines the power offsets from actual or simulated performance results and selection objectives.

Alternatively, the reception point may determine the power offsets from the MCS level signaled by the transmission point and selection objectives. Therefore, the transmission point does not have to explicitly signal the power offsets, thereby reducing signaling overhead. In some alternate example embodiments, the transmission point signals the power offsets to the reception point. The signaling of the power offsets to the reception point may be useful in some situations, such as when the reception point has limited computational capabilities or if the reception point is heavily loaded computationally, for example. As an illustrative example, the transmission point explicitly signals the power offsets to multiple reception points in a broadcast message or to individual reception points in reception point specific messages. The power offsets may also be signaled in higher layer messages, such as radio resource control (RRC) messages.

The transmission point encodes an input bit block of a data stream (block 430) and maps the encoded bit block to codewords (block 435). The encoding of the input bit block is in accordance with an FEC code. The encoded bit block is mapped to the codewords in accordance with the SCMA codebooks and the power offsets prior to transmission. As an illustrative example, in SCMA, the encoded bit block is mapped using the SCMA codebooks after the power offsets have been applied to the SCMA codebooks. The transmission point transmits the codewords (block 440). Blocks 430 and 435 are repeated for each data stream.

FIG. 5 illustrates a flow diagram of example operations 500 occurring in a reception point. Operations 500 may be indicative of operations occurring in a reception point as the reception point receives a transmission from a transmission point.

Operations 500 begin with the reception point receiving a FEC code rate and a constellation size for a transmission from the transmission point (block 505). Knowledge of the FEC code rate and the constellation size simplify the decoding of the transmission for the reception point as compared to blind detection. Although more computationally complex, it is possible for the reception point to use blind detection to determine the FEC code rate and the constellation size. Blind detection involves the reception point applying hypotheses of the FEC code rate and the constellation size used in the transmission in order to find the FEC code rate and the constellation size actually used in the transmission.

The reception point determines the power offsets for the various layers of the transmission (block 510). The power offsets may be determined based on communications parameters and selection objectives. Alternatively, the reception point may determine the power offsets in accordance with the MCS level signaled by the transmission point. The reception point receives encoded data (block 515) and decodes at least a portion of the encoded data to produce a data stream (block 520). The decoding of the encoded data is in accordance with the FEC code rate and the constellation size, as well as the power offsets.

In some example embodiments, the reception point receives the power offsets from the transmission point. The power offset may be received in a broadcast message or a reception point specific message. Alternatively, the power offset may be received in a higher layer message, such as an RRC message.

Tables 2 and 3 provide a performance comparison of SCMA-OFDM with power offsets against DL OFDM and LDS in an additive white Gaussian noise (AWGN) environment (Table 2) and in a single input multiple output (SIMO) fading environment (Table 3), respectively. As shown in Tables 2 and 3, SCMA-OFDM with power offsets can achieve as much as a 0.8 dB performance gain over DL OFDM and more than a 3 dB performance gain over LDS.

AWGN:

TABLE 2

Performance comparison of SCMA-OFDM featuring power offsets against DL OFDM and LDS for different SE values (AWGN environment).

| SE (bits/tone) | MCS for SCMA-OFDM w Power Offset (constellation points, layers, FEC code rate) | MCS for DL OFDMA (QAM points, FEC code rate) | MCS for LDS (constellation points, layers, FEC code rate) | Gain over OFDMA (dB) | Gain over LDS (dB) |
|---|---|---|---|---|---|
| 0.5 | 8-point, 2 layers, CR 1/3 | QPSK CR 1/4 | 4-point, 4 layers, CR 1/4 | ~0 | 0.47 |
| 0.75 | 16-point, 2 layers, CR 3/8 | QPSK CR 3/8 | 4-point, 4 layers, CR 3/8 | ~0 | 0.43 |
| 1 | 16-point, 2 layers, CR 1/2 | QPSK CR 1/2 | 4-point, 6 layers, CR 1/3 | ~0 | 0.51 |
| 1.5 | 16-point, 4 layers, CR 3/8 | 16QAM CR 3/8 | 4-point, 6 layers, CR 1/2 | ~0.3 | 0.96 |
| 2 | 16-point, 4 layers, CR 1/2 | 16QAM CR 1/2 | 4-point, 6 layers, CR 2/3 | ~0.2 | 1.2 |
| 3 | 16-point, 4 layers, CR 3/4 | 16QAM CR 3/4 | 16-point, 4 layers, CR 3/4 | ~0.2 | 3.72 |

DL SIMO Fading:

TABLE 3

Performance comparison of SCMA-OFDM featuring power offsets against DL OFDM and LDS for different SE values (SIMO fading environment).

| SE (bits/tone) | MCS for SCMA-OFDM w Power Offset (constellation points, layers, FEC code rate) | MCS for DL OFDMA (QAM points, FEC code rate) | MCS for LDS (constellation points, layers, FEC code rate) | Gain over OFDMA (dB) | Gain over LDS (dB) |
|---|---|---|---|---|---|
| 0.5 | 8-point, 2 layers, CR 1/3 | QPSK CR 1/4 | 4-point, 4 layers, CR 1/4 | ~0.1 | 0.5 |
| 0.75 | 16-point, 2 layers, CR 3/8 | QPSK CR 3/8 | 4-point, 4 layers, CR 3/8 | ~0.1 | 0.6 |
| 1 | 4-point, 6 layers, CR 1/3 | QPSK CR 1/2 | 4-point, 6 layers, CR 1/3 | ~0 | 0.45 |
| 1.5 | 16-point, 4 layers, CR 3/8 | 16QAM CR 3/8 | 4-point, 6 layers, CR 1/2 | ~0.25 | 0.9 |
| 2 | 16-point, 4 layers, CR 1/2 | 16QAM CR 1/2 | 4-point, 6 layers, CR 2/3 | 0.73 | 1.71 |

TABLE 3-continued

Performance comparison of SCMA-OFDM featuring power offsets against DL OFDM and LDS for different SE values (SIMO fading environment).

| SE (bits/tone) | MCS for SCMA-OFDM w Power Offset (constellation points, layers, FEC code rate) | MCS for DL OFDMA (QAM points, FEC code rate) | MCS for LDS (constellation points, layers, FEC code rate) | Gain over OFDMA (dB) | Gain over LDS (dB) |
|---|---|---|---|---|---|
| 3 | 16-point, 4 layers, CR 3/4 | 64QAM CR 1/2 | 16-point, 4 layers, CR 3/4 | 0.42 | 3.16 |
| 4 | 256-point, 4 layers, CR 0.5 | 64QAM CR 2/3 | — | 0.4 | — |
| 5 | 256-point, 4 layers, CR 5/8 | 256QAM CR 5/8 | — | 0.87 | — |
| 6 | 256-point, 4 layers, CR 3/4 | 256QAM CR 3/4 | — | 0.4 | — |

Figure 6:
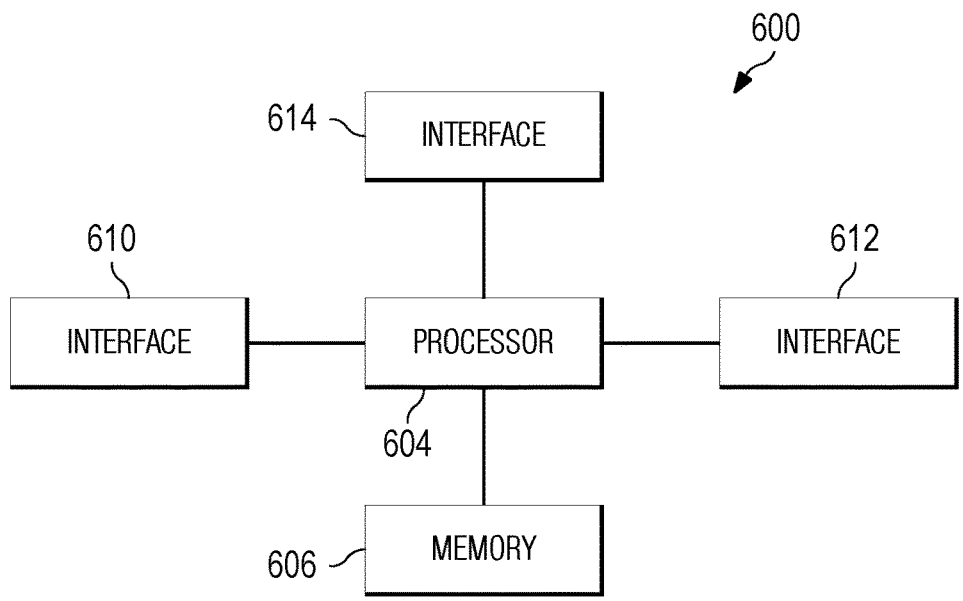
FIG. 6 illustrates a block diagram of an embodiment processing system for performing methods described herein.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
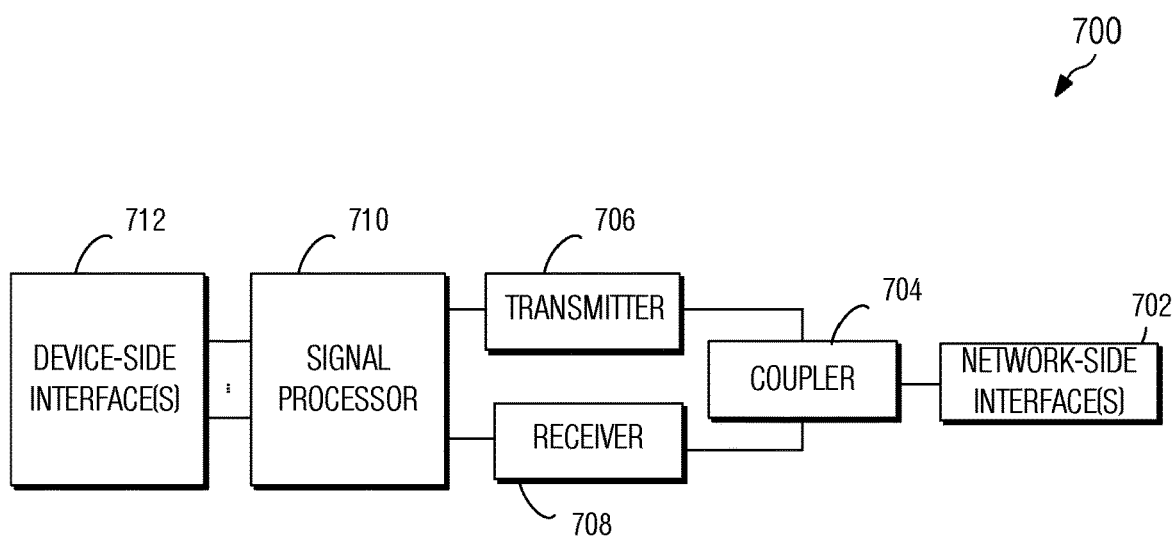
FIG. 7 illustrates a block diagram of a transceiver that can be used to transmit and receive signals over a telecommunications network.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for operating a transmission point, the method comprising:
    determining, by the transmission point, power offset levels of code-domain data layers assigned to at least one reception point, the code-domain data layers comprising a first code-domain data layer of a first spreading codebook and a second code-domain data layer of a second spreading codebook, the power offset levels comprising a first power offset level corresponding to the first code-domain data layer and a second power offset level corresponding to the second code-domain data layer,
    wherein the first power offset level is applied to the first spreading codebook,
    wherein the second power offset level is applied to the second spreading codebook, and
    wherein the second spreading codebook has different codewords than the first spreading codebook;
    assigning, by the transmission point, the first power offset level to the first code-domain data layer associated with the first spreading codebook;
    assigning, by the transmission point, the second power offset level to the second code-domain data layer associated with the second spreading codebook;
    encoding, by the transmission point, a first data stream associated with the first code-domain data layer using the first spreading codebook to produce a first plurality of codewords;
    encoding, by the transmission point, a second data stream associated with the second code-domain data layer using the second spreading codebook to produce a second plurality of codewords; and
    transmitting, by the transmission point, the first plurality of codewords at the first power offset level corresponding to the first code-domain data layer and the second plurality of codewords at the second power offset level corresponding to the second code-domain data layer.

2. The method of claim 1, wherein determining the power offset levels comprises receiving the power offset levels from a power offset level selecting device.

3. The method of claim 1, wherein determining the power offset levels comprises determining the power offset levels in accordance with a selection objective and at least one communications parameter for performance gain of a communications system including the transmission point.

4. The method of claim 3, wherein the at least one communications parameter comprises at least one of a transmission rate of the first and second pluralities of codewords, a size of a constellation used in a transmission of the first and second pluralities of codewords, a forward error correcting (FEC) code rate used to encode the first and second data streams, and actual or simulated performance results of the communications system.

5. The method of claim 1, wherein transmitting the first plurality of codewords and the second plurality of codewords comprises:
    mapping a first encoded data to the first plurality of codewords using a first codebook adjusted in accordance with the first power offset level associated with the first code-domain data layer;
    mapping a second encoded data to the second plurality of codewords using a second codebook adjusted in accordance with the second power offset level associated with the second code-domain data layer; and
    transmitting the first and second pluralities of codewords.

6. The method of claim 5, wherein mapping the first encoded data comprises:
    applying the first power offset level to a first sparse code multiple access (SCMA) codebook, thereby producing a first adjusted SCMA codebook; and
    applying the first adjusted SCMA codebook to the first data stream to produce the first plurality of codewords.

7. The method of claim 1, further comprising:
    determining, by the transmission point, a FEC code rate and a size of a constellation used in a transmission in accordance with a quality of a channel between the transmission point and the at least one reception point; and
    transmitting, by the transmission point, the FEC code rate and the size of the constellation.

8. The method of claim 1, further comprising:
    transmitting, by the transmission point, the power offset levels to the at least one reception point.

9. The method of claim 1, further comprising:
    encoding, by the transmission point, a third data stream associated with the first code-domain data layer to produce a third plurality of codewords; and
    transmitting, by the transmission point, the third plurality of codewords at a same power offset level as the first plurality of codewords.

10. The method of claim 1, further comprising:
    encoding, by the transmission point, a third data stream associated with a third code-domain data layer to produce a third plurality of codewords, wherein sparse codes associated with the first code-domain data layer are orthogonal to sparse codes associated with the third code-domain data layer; and
    transmitting, by the transmission point, the third plurality of codewords at a same power offset level as the first plurality of codewords.

11. The method of claim 1, wherein the first power offset level is applied to the first spreading codebook and the second power offset level is applied to the second spreading codebook for multiplexing the first code-domain data layer of the first spreading codebook and the second code-domain data layer of the second spreading codebook in the code domain.

12. A method for operating a reception point, the method comprising:
    determining, by the reception point, power offset levels of code-domain data layers, the code-domain data layers comprising a first code-domain data layer of a first spreading codebook and a second code-domain data layer of a second spreading codebook, the power offset levels comprising a first power offset level corresponding to the first code-domain data layer and a second power offset level corresponding to the second code-domain data layer,
    wherein the first power offset level is applied to the first spreading codebook,
    wherein the second power offset level is applied to the second spreading codebook, and
    wherein the second spreading codebook has different codewords than the first spreading codebook;

assigning, by the reception point, the first power offset level to the first code-domain data layer associated with the first spreading codebook;

assigning, by the reception point, the second power offset level to the second code-domain data layer associated with the second spreading codebook;

receiving, by the reception point, a plurality of codewords from a transmission point; and decoding, by the reception point, at least a portion of the plurality of codewords in accordance with the power offset levels, a forward error correcting (FEC) code, and a size of a constellation associated with the plurality of codewords.

13. The method of claim 12, wherein determining the power offset levels comprises receiving the power offset levels in a message from the transmission point.

14. The method of claim 13, wherein the message comprises one of a broadcast message, a reception point specific message, and a radio resource control message.

15. The method of claim 12, wherein determining the power offset levels comprises determining the power offset levels in accordance with a selection objective and at least one communications parameter for performance gain of a communications system including the reception point.

16. The method of claim 15, wherein the at least one communications parameter comprise at least one of a transmission rate of the plurality of codewords, a size of a constellation used in a transmission of the plurality of codewords, a FEC code rate used in encoding the plurality of codewords, and actual or simulated performance results of the communications system.

17. A transmission point comprising:
a processor; and
a non-transitory computer readable storage medium storing programming for execution by the processor, the programming including instructions to configure the transmission point to:
  determine power offset levels of code-domain data layers assigned to at least one reception point, the code-domain data layers comprising a first code-domain data layer of a first spreading codebook and a second code-domain data layer of a second spreading codebook, the power offset levels comprising a first power offset level corresponding to the first code-domain data layer and a second power offset level corresponding to the second code-domain data layer,
  wherein the first power offset level is applied to the first spreading codebook,
  wherein the second power offset level is applied to the second spreading codebook, and
  wherein the second spreading codebook has different codewords than the first spreading codebook,
  assign the first power offset level to the first code-domain data layer associated with the first spreading codebook,
  assign the second power offset level to the second code-domain data layer associated with the second spreading codebook,
  encode a first data stream associated with the first code-domain data layer using the first spreading codebook to produce a first plurality of codewords,
  encode a second data stream associated with the second code-domain data layer using the second spreading codebook to produce a second plurality of codewords, and
  transmit the first plurality of codewords at the first power offset level corresponding to the first code-domain data layer and the second plurality of codewords at the second power offset level corresponding to the second code-domain data layer.

18. The transmission point of claim 17, wherein the programming includes instructions to receive the power offset levels from a power offset level selecting device.

19. The transmission point of claim 17, wherein the programming includes instructions to determine the power offset levels in accordance with a selection objective and at least one communications parameter for performance gain of a communications system including the transmission point.

20. The transmission point of claim 17, wherein the programming includes instructions to map first encoded data to the first plurality of codewords using a first codebook adjusted in accordance with the first power offset level associated with the first code-domain data layer, map second encoded data to the second plurality of codewords using a second codebook adjusted in accordance with the second power offset level associated with the second code-domain data layer, and transmit the first and second plurality of codewords.

21. The transmission point of claim 20, wherein the programming includes instructions to apply the first power offset level to a first sparse code multiple access (SCMA) codebook, thereby producing a first adjusted SCMA codebook, and apply the first adjusted SCMA codebook to the first data stream to produce the first plurality of codewords.

22. The transmission point of claim 17, wherein the programming includes instructions to determine a FEC code rate and a size of a constellation used in a transmission in accordance with a quality of a channel between the transmission point and the at least one reception point, and transmit the FEC code rate and the size of the constellation.

23. A reception point comprising:
a processor; and
a non-transitory computer readable storage medium storing programming for execution by the processor, the programming including instructions to configure the reception point to:
  determine power offset levels of code-domain data layers, the code-domain data layers comprising a first code-domain data layer of a first spreading codebook and a second code-domain data layer of a second spreading codebook, the power offset levels comprising a first power offset level corresponding to the first code-domain data layer and a second power offset level corresponding to the second code-domain data layer,
  wherein the first power offset level is applied to the first spreading codebook,
  wherein the second power offset level is applied to the second spreading codebook, and
  wherein the second spreading codebook has different codewords than the first spreading codebook,
  assign the first power offset level to the first code-domain data layer associated with the first spreading codebook,
  assign the second power offset level to the second code-domain data layer associated with the second spreading codebook,
  receive a plurality of codewords from a transmission point, and
  decode at least a portion of the plurality of codewords in accordance with the power offset levels, a forward error correcting (FEC) code, and a size of a constellation associated with the plurality of codewords.

24. The reception point of claim 23, wherein the programming includes instructions to receive the power offset levels in a message from the transmission point.

25. The reception point of claim 23, wherein the programming includes instructions to determine the power offset levels in accordance with a selection objective and at least one communications parameter for performance gain of a communications system including the reception point.

* * * * *